United States Patent [19]
Arnett

[11] 3,754,442
[45] Aug. 28, 1973

[54] TEMPERATURE MEASURING SYSTEM PRODUCING LINEAR OUTPUT SIGNAL FROM NON-LINEAR SENSING RESISTANCE

[75] Inventor: Charles J. Arnett, Union, Ohio
[73] Assignee: Instrulab, Inc., Dayton, Ohio
[22] Filed: Dec. 1, 1970
[21] Appl. No.: 93,984

[52] U.S. Cl. ........ 73/362 AR, 323/75 H, 323/75 N, 324/62 R
[51] Int. Cl. ............................................. G01k 7/24
[58] Field of Search ............. 73/362 AR; 323/75 H, 323/75 N; 324/62 R

[56] References Cited
UNITED STATES PATENTS
3,517,556  6/1970   Barker ........................... 73/362 AR
2,098,650  11/1937  Stein .............................. 73/362 AR
3,473,385  10/1969  Komatsubara ................ 73/362 AR
3,379,973  4/1968   Walton ....................... 73/362 AR X
3,441,846  4/1969   Petrohilos .................. 73/362 AR X
3,568,044  3/1971   Elazar .......................... 324/62 R X OTHER PUBLICATIONS
Stauffer, G. C. et al., Alloys of Iron and Nickel in Resistance Thermometry. In Temperature–Its Measurement & Control in Science & Industry, Reinhold, N.Y., 1941, pp. 1236–1237.
Hoge, H. J. Temperature Measurement in Engineering. In Temperature–Its Measurement & Control in Science & Engineering, Am Inst. Physics, Vol. 2, Reinhold, N.Y., 1955, p. 312 only.

Primary Examiner—Richard C. Queisser
Assistant Examiner—Frederick Shoon
Attorney—Jacox and Meckstroth

[57] ABSTRACT

A temperature measuring and indicating system producing an electrical output signal which is substantially a linear function of the temperature sensed by a temperature sensitive resistance element which has a non-linear temperature resistance characteristic. One or more operational amplifiers or other current generators are used to excite the resistance temperature sensing element. The voltage generated across the temperature sensitive resistance element is sensed. Through a current generator a signal is induced in the temperature sensitive resistance element which is proportional to the difference between a given reference temperature and a temperature sensed by the temperature sensitive resistance element.

28 Claims, 4 Drawing Figures

Patented Aug. 28, 1973

3,754,442

SIGNAL PROCESSING CIRCUIT

INVENTOR
CHARLES J. ARNETT
BY William R Jacox
ATTORNEY

TEMPERATURE MEASURING SYSTEM PRODUCING LINEAR OUTPUT SIGNAL FROM NON-LINEAR SENSING RESISTANCE

DESCRIPTION OF THE PRIOR ART

In the prior art of thermometry, it is well known that a temperature sensitive resistance element offers advantages over other forms of electrical temperature sensing elements. A temperature measuring system utilizing a temperature sensitive resistance element requires no comparison standard, that is, no reference junction and also requires less amplification of its output signal than does a thermocouple sensor element. Thus, there are often both practical advantages and cost savings inherent in a temperature sensing resistance element system over the thermocouple system for temperature measurement and over other types of systems for temperature measurement.

One property of most temperature sensitive resistance elements has severely detracted from its usefulness and prompted several corrective attempts in the prior art. This detracting factor concerns the pronounced tendency in the resistance of a temperature sensing resistance element to depart from a linear, straight line, first order mathematical relationship with the temperature of the resistance element.

In the prior art there have evolved several techniques for dealing with the departure of a temperature sensitive resistance element from the desired linear relationship with temperature. Among these techniques are the following:

1. The use of temperature compensated resistance sensor elements, elements which are constructed of two materials which have approximately equal but opposite departures from a linear temperature response.
2. The use of manual tables of correction wherein an operator converts an indicated temperature into a true tem-perature by the use of a cross-reference table.
3. The use of voltage sensitive or current sensitive compensating elements in the electrical circuitry coupled to the temperature sensitive resistance element.
4. Limitation of the operating range of the temperature sensitive resistance element to a temperature range wherein it may be considered practically linear.
5. Coupling to the resistance sensor device a bridge circuit or other electrical circuit containing adjustable correcting electrical elements which require operator adjustment according to the temperature range being sensed.

Each of these prior art techniques for dealing with the non-linearity of a temperature sensitive resistance element is useful in a limited number of applications. However, none has met the present need for a fast, low cost, accurate and rugged measuring instrument which permits a temperature sensitive resistance element to be used with complete satis-faction.

SUMMARY OF THE INVENTION

The invention of this application provides a technique by which the departure of a resistance temperature detector element from the desired linear relationship with temperature may be compensated for in an automatic and almost ideal manner. The invention also relates to a technique in which the thermally responsive resistance of a resistance temperature detector element is measured by passing through the resistance temperature detector element a current which is not constant in magnitude but which is a function of the temperature being sensed by the resistance temperature detector element.

The invention also relates to a technique for deriving a temperature-dependent exciting current from signals which are inherently developed by a circuit coupling a resistance temperature detector element to a linear scale temperature-indicating instrument.

The present invention also relates to circuitry in which an exciting current is developed which is nearly proportional to the temperature of the resistance temperature detector element but departs from this proportional relationship in an advantageous manner.

This invention also relates to a method of compensating for the departure of a resistance temperature detector element from a linear curve of resistance versus temperature. This invention includes a circuit which may be used to couple between existing resistor temperature detector elements and existing indicator instruments.

The present invention compensates for non-linearity by making the total current which flows in a resistance temperature detector element, the summation of currents originating in both a constant current generator and a temperature dependent current generator. In one embodiment of the invention, one current generator is disclosed, and in one embodiment of the invention a two-current generator system is employed. A resistance temperature detector element is located in the feedback network surrounding an operational amplifier in a position in which the total current flowing in the element is determined by the input signals applied to the operational amplifier.

OBJECTS AND ADVANTAGES OF THE INVENTION

In the thermometry art the name resistance temperature detector element, which is abbreviated as RTD, is used to describe temperature sensitive resistance elements.

It is an object of the present invention to provide a method of compensating for the lack of linear temperature response in a resistance temperature detector RTD element.

It is a further object of the present invention to provide a non-complex electronic circuit embodiment of the method of compensating.

It is a further object of the present invention to provide compensation for non-linear temperature response in an RTD element without employing counteracting non-linear temperature responsive elements.

It is a further object of the present invention to provide compensation for non-linear temperature response in an RTD element without employing electrical circuit elements having voltage or current dependent values.

DETAILED DESCRIPTION OF THE INVENTION

FIG. 1

Figure 1:
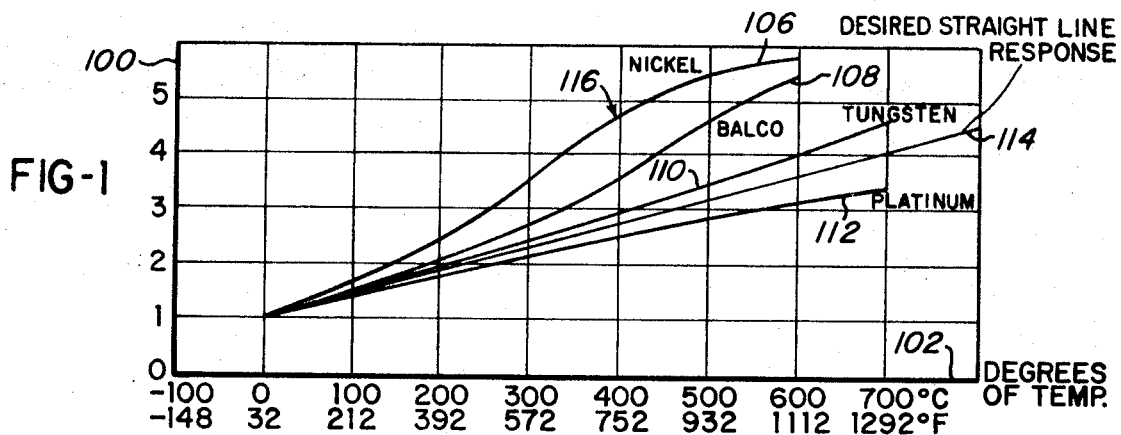
FIG. 1 is a graphical illustration of the resistance versus temperature behavior for several metals which are commonly used in resistance temperature detector elements.

FIG. 1 of the drawings is a graphic view showing the degree of non-linearity to be expected when any one of several common metals is employed as the temperature sensing resistance element in a resistance thermometry system. In FIG. 1, a vertical scale 100 represents normalized resistance, that is, resistance of a temperature sensitive resistance detector, RTD, at some unknown temperature divided by its resistance at 32° F. A horizontal scale 102 represents degrees of temperature expressed in both centigrade and Fahrenheit degrees.

In FIG. 1 the numeral 114 refers to a straight line and illustrates a condition in which there is a straight line relationship between resistance and temperature.

A curve 106 in FIG. 1 represents the resistance versus temperature response of an RTD element made from the element nickel. A curve 110 represents the temperature-resistance response of an RTD element made from the element tungsten and the curve 108 represents the temperature-resistance response of a metal called "Balco", an alloy containing 70 percent nickel and 30 percent iron.

Comparing the curves 106, 108 and 110 to the straight line 114, it is significant to note that each of the curves 106, 108 and 110 is concaved upward, that is, has an increasing temperature sensitivity with increasing temperature. The curve 106, for nickel, departs from this concave upward shape in a region 116 at temperatures near 750° F. Above this temperature the nickel resistance element shows decreasing sensitivity with temperature.

In contrast with the concave upward shape of the curves for the nickel, tungsten and "Balco" metals, a curve 112, which illustrates the temperature-resistance characteristic of platinum, shows that the curve for the element platinum is concaved downwardly to a slight degree. That is, platinum resistance temperature detector elements display decreasing temperature sensitivity with increases in temperature. The curve 112 is of special interest in the thermometry art because of the wide acceptance of platinum as a standard for resistance temperature measurements. A platinum resistance temperature detector element displays usable characteristics over a wide range of temperatures. Platinum also displays the smallest degree of non-linearity of the four metals shown in FIG. 1. For a temperature measuring system which is limited to the range of zero to 500° C., for instance, a platinum resistance temperature detector element has a best fit non-linearity near 2 percent of the total resistance change, while tungsten has a best fit non-linearity near 4 percent and "Balco" has a best fit non-linearity exceeding 6 percent and nickel has a best fit non-linearity near 6 percent. For the temperature range above 32° F., the mathematical equation developed by H. L. Callendar in the early 1920's has been shown to closely predict the resistance behavior of the element platinum with increasing temperatures. This equation expresses the resistance of platinum in terms of a mathematical equation involving second order function of temperature. For temperatures below 32° F., the resistance behavior of the element platinum is predicted by a modified form of the Callendar equation, a modified form which is attributed to the work of Van Dusen. The Callendar-Van Dusen equation employs a fourth order polynomial of temperature to predict the resistance behavior of platinum. In this equation, the third and fourth order terms have zero coefficients for temperatures above 32° F. The Callendar-Van Dusen equation is well known in the resistance thermometry art; however it is repeated for reference here in one of its more popular forms:

$$T = (RT - RO)/(R100 - RO) \ 100 + k \ (T)/(100 - 1)$$
$$100 + B[ \ (T)/(100 - 1) \ (T)^3/(100),]$$

wherein:

$T$ is the measured temperature expressed in degrees centigrade.

$R_T$ is the resistance of platinum at a temperature of $T$ degrees centigrade.

$R_o$ is the resistance of platinum at a temperature of zero degrees centigrade.

$R_{100}$ is the resistance of platinum at a temperature 100° C.

$K$ is a constant near 1.5 and is determined by solving the above equation at a known high temperature such as the boiling point of sulphur and adding B=O.

B is a constant of O for T greater than 32° F. and is near 0.11 for T below 32° F. and is determined by solving the above equation for B at a low temperature such as the boiling point of liquid oxygen.

FIG. 2

Figure 2:
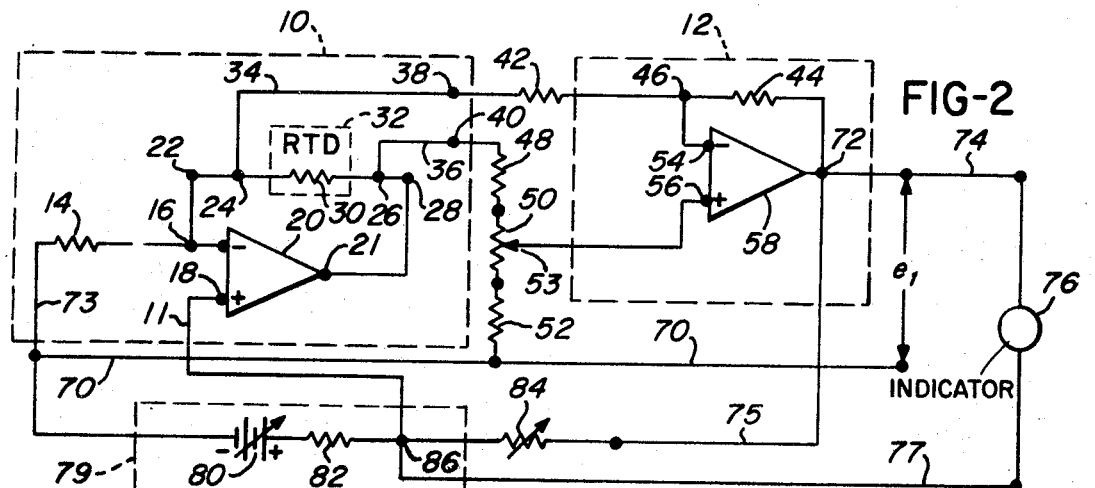
FIG. 2 is an electrical schematic diagram illustrating one embodiment of a temperature measuring system made in accordance with the present invention.

The circuitry of FIG. 2 includes a reference source of electrical energy 79, which may be of any suitable type. The reference source 79 is shown as including a power supply 80 which may have an internal impedance 82.

The reference source 79 is joined to a common conductor 70. A summing node 16 of an operational amplifier 20 is also joined to the common conductor 70 by means of a conductor 73, through a resistance element 14. The operational amplifier 20 also has an input terminal 18 which is joined by a conductor 11 to the reference source 79. The operational amplifier 20 has an output terminal 21. A resistance temperature detector (RTD) 30 has a terminal 22 and a terminal 28. The terminal 22 is connected to the summing node 16 of the operational amplifier 20, and the terminal 28 is connected to the output terminal 21 of the operational amplifier 20. Thus, the operational amplifier 20 with the resistance temperature detector 30 and the resistance element 14 is considered herein as comprising an operational amplifier network 10.

The RTD 30 is disposed within an environment 32, the temperature of which is sensed by the system of this invention.

The RTD 30 also has terminals 24 and 26. Connected to the terminal 24 is a conductor 34 which is also joined to a terminal 38. Connected to the terminal 26 is a conductor 36 which is also joined to a terminal 40.

Joined to the terminal 40 in series relationship are resistance elements 48, 50 and 52. The resistance element 52 is also connected to the conductor 70 which is joined to the conductor 73.

The resistance element 50 is shown as having an adjustable tap 53 which is connected to an input terminal 56 of an operational amplifier 58. The operational amplifier 58 also has a summing node 54 which is connected to a terminal 46 of a resistance element 44. Joined to the terminal 46 is a resistance element 42 which is also connected to the terminal 38. The resistance element 44 is also connected to an output terminal 72 of the operational amplifier 58. Thus, the operational amplifier 58 with the resistance element 44 is considered herein as comprising an operational amplifier network 12.

A conductor 74 is connected to the terminal 72 and is also joined to any suitable voltage sensing device 76. The voltage sensing device 76 is also connected to the reference source of electrical energy 79 by means of a conductor 77.

A resistance element 84 is connected to the reference source of electrical energy 79 and also to a conductor 75. The conductor 75 is also joined to the output terminal 72 of the operational amplifier 58.

The operational amplifier network 10 performs in a manner similar to that of a conventional operational amplifier having a grounded or zero signal input applied to its summing node input terminal. As known in the art of operational amplifiers, an output signal, $E_o$, is obtained from an operational amplifier operating with a positive input terminal signal and with the negative input connected through a resistance to a point of zero signal. This situation is represented by the expression $E_o = [(1 + R_2)/(R_1)] E_{in}$, in which $R_2$ is the resistance between the output terminal and the summing node terminal, and $R_1$ is the resistance between the summing node terminal and a point of zero signal.

The performance of the operational amplifier 20 is similar to that of a conventional operational amplifier, with the exception that the desired output signal is not a voltage existing between the output terminal of the amplifier and a common ground terminal. The output signal from the operational amplifier 20 is actually a current signal. The current output of the operational amplifier 20 is sensed by measuring the voltage across the RTD element 30. This sensing is accomplished by the operational amplifier network 12.

The operational amplifier network 12 is connected to the RTD element 30 in such a manner that the output voltage of the operational amplifier network 12 represents only the differential voltage appearing between terminals 38 and 40; that is, the operational amplifier network 12 rejects and does not reproduce any common mode signal which simultaneously raises the voltage at terminals 40 and 38. The amplifier network 12 amplifies only signals which represent the differential between the voltage at terminal 38 and the voltage at terminal 40. In one embodiment of the invention, it has been found possible to achieve desirable differential response in the operational amplifier network 12 by making each of the resistors 42, 44, 48 and 52 of equal magnitude.

The variable resistor 50 shown in FIG. 2 is used to cancel out or compensate for small imperfections such as offset signal and lack of perfectly matched components in the circuitry surrounding both of the operational amplifier networks 10 and 12. Adjustment of resistor 50 is described in greater detail in a following section of the specification.

In mechanizing the FIG. 2 circuit of this invention, it has been found desirable to use the conventional four terminal configuration for the RTD element 30. Thus, in this configuration current is applied to one pair of terminals of the RTD element and the voltage developed across the RTD element is sensed by another pair of terminals. A four terminal configuration is accomplished by providing current through the RTD element 30 via terminals 22 and 28 and measuring voltage across the RTD element via terminals 24 and 26. The four terminal RTD configuration allows the length of the lead wires connecting the RTD element 30 to the operational amplifier 20 to be non-critical; that is, since the voltage drop appearing across the current leads of the conductors connecting the RTD element 30 to the operational amplifier 20 is not included in the voltage sensed across terminals 24 and 26, the length of the current leads is not critical and does not appreciably change the calibration of the system. In a similar fashion, the voltage drop appearing between RTD terminals 22 and 24, and between 26 and 28 does not affect system calibration with the four terminal configuration.

Location of the RTD element 30 in the feedback path of the operational amplifier 20 offers several desirable advantages over prior art techniques for exciting an RTD element. One of these advantages is that current in the RTD element 30 can easily be maintained at a constant value independent of temperature of the RTD element 30. That is, in this location the RTD element 30 is excited by a current source rather than by a voltage source. Location of the RTD element in the feedback path of the operational amplifier 20 also makes it convenient to apply several signals to the RTD element 30 and allows each of these several signals to be referenced to a common reference point. This is accomplished simply by applying multiple signals to the operational amplifier input terminals.

The reference voltage source 80 may be any suitably well-regulated source of voltage, such as a battery, as illustrated, or a regulated AC to DC power supply. It is desirable that the voltage of the source 80 be free of spur-ious signals and variations resulting from temperature change.

The operational amplifiers 20 and 58 may comprise any suitable operational amplifier circuit and are available from several manufacturers. It is possible that the operational amplifiers 20 and 58 may comprise vacuum tube components. However, amplifiers employing junction or field effect transistors have proven to be more satisfactory because of their smaller size and low tendency to drift with time and temperature. One operational amplifier which has been found satisfactory for use in the FIG. 2 circuitry is the amplifier manufactured by National Semi-conductor Corporation and designated as a LM-201 amplifier. Preferably an amplifier is selected which has low drift and low offset voltage.

QUANTITATIVE DESCRIPTION

Since the present invention relates to a measuring system and involves the use of computational or operational amplifiers, a complete description requires some consideration of the correlation between signal amplitudes and mathematical quantities. In this portion of the specification, this correlation is described.

It has been found convenient in some uses of the FIG. 2 circuitry to employ as a voltage sensing instrument 76, a digital voltmeter having a resolution of one millivolt. Thus, the digital voltmeter can be made to read directly in degrees of temperature.

As an indicator of degrees of temperature, it has been found convenient to employ a digital voltmeter having scaled increments that measure millivolts of potential on either the centigrade or Fahrenheit scale. To permit this correlation, it is necessary to specifically select some of the components so that a 1° change in temperature of the RTD element 30 produces a 1 millivolt change in the signal applied to instrument 76.

As an example of this selection, let it be assumed that an RTD element 30 having 100 ohms of electrical resistance at a temperature of 0° C. is to be coupled through the circuit to a voltage sensing device 76 which comprises a digital voltmeter having one millivolt resolution and that it is desired to have the sensing device 76 read in degrees centigrade. (A platinum RTD element such as this is available as Catalog Item No. 612 from Winsco Instruments and Controls Company, Inc. of Santa Monica, Cal.) If the gain of the operational amplifier circuit 12 is unity, a one millivolt output signal at the terminal 72 requires that the differential voltage between terminals 38 and 40 must also be 1 millivolt. Therefore, it is necessary that 1° C. of temperature produce a 1 millivolt change in the voltage across the RTD element 30. Since 1° C. of temperature change across a 100 ohm platinum RTD element produces about 0.4 ohms of resistance change in the RTD element 30, it is apparent that a current of substantially 2.5 milliamperes must flow in the RTD element 30 in order that one centigrade degree of temperature change be represented by 1 millivolt of signal change across the RTD element 30. The input signal applied to the terminal 18 of the operational amplifier 20 must therefore be one which will cause 2.5 milliamperes of current flow in the RTD element.

In one embodiment of the circuit, it has been found convenient that the resistor 14 be of a value equal to the reference temperature resistance of the RTD element 30. That is, in the present example wherein a 100 ohm resistor at zero degrees centigrade RTD element 30 is employed, the resistor 14 is also made equal to 100 ohms. With a 100 ohm value of resistor 14, it is necessary that voltage source 80 supply a voltage of 250 millivolts in order that two and one-half milliamperes of current flow in the resistors RTD 30 and 14.

Thus, by making the voltage of reference source 80 equal to 250 millivolts and making resistors RTD 30 and 14 each nominally equal to 100 ohms, the circuit of FIG. 2 produces 1 millivolt of change at the terminal 72 for every degree of centigrade temperature change encountered by the RTD element 30. In order for the voltage sensing device 76 to have an electrical input of zero volts at 0° F., it has been found convenient in the circuit of FIG. 2 that the resistor 14 has a value of 90.92 ohms. In the manner which was illustrated previously for the centigrade degrees increments in the voltage sensing device 76, it is found that for the voltage sensing device 76 to have an output of one millivolt for every degree Fahrenheit, a voltage of substantially 420 millivolts is desired at the reference source 80.

By extending the technique described above, it is possible for the voltage sensing device 76 to have an electrical input of zero volts at any convenient and desired reference temperature. For example, if a temperature measuring system wherein it is desired to measure degrees of temperature above a normal temperature of 100° F. is desired, this may be accomplished with the FIG. 2 circuit by inserting a resistor 14 which has a resistance value equal to the RTD element 30 at a temperature of 100° F. Also by extending the technique described above, it is possible for a 1 millivolt signal at the terminal 72 to represent temperatures other than 1° of Fahrenheit or centigrade temperature. For example, 1 millivolt might be made to represent one-tenth of a degree of temperature by suitably altering the current which flows in the RTD element 30.

It must be considered, however, that a limitation does exist in the sensitivity which can be obtained from the FIG. 2 circuitry because of the errors imposed by self-heating in the RTD element. For instance, it has been found desirable for a certain platinum RTD element to maintain currents below five milliamperes in order that error from self-heating be minimized. As will be explained in a following section of this specification, the need for increased sensitivity in the FIG. 2 circuitry without increasing the current flow in the RTD element can be met by the use of an additional amplifier device connected to the output terminal 72. This is explained below.

It has been found convenient in adjusting the circuitry of FIG. 2 to a particular temperature measuring application to use a decade resistance box as a substitute for the RTD element 30. In this set-up procedure, the resistance of the selected RTD element corresponding to a zero volt output at the terminal 172 (and also to the reference temperature) is provided by the decade box in lieu of RTD element 30. One procedure which has been found convenient for this adjustment is as follows:

1. Adjust the value of the decade box to the resistance of the RTD element at zero degrees or at whatever reference temperature is selected as a reference temperature.
2. Adjust the value of resistor 50 until the output of the voltage sensing device 76 is zero.
3. Set the value of the resistance of the decade box to a value equal to the resistance of the RTD element between the reference temperature and the highest temperature to be measured by the system.
4. Adjust the value of the reference voltage source 80 until the voltage sensor device 76 reads one-half scale.
5. Set the resistance of the decade box to a resistance value equalling the resistance of the RTD element at the upper limit temperature.
6. Adjust the resistor 84 until the voltage sensing device 76 reads the highest temperature to be measured.
7. Repeat the steps, starting with the adjustment of the resistor 50, and ending with the adjustment of resistor 84.

In the circuit of FIG. 2, the current which flows in the resistor 84 is primarily a constant current but has a slight deviation which is a function of temperature. However, the output of the operational amplifier 58 is not a perfectly linear function of temperature since the compensation for the non-linearity of the RTD element 30 afforded by the circuitry of FIG. 2 is not mathematically perfect. Since the resistor 84 provides the signal which is developed in the amplifier 58 back into the input of operational amplifier 20, the departures from perfectly linear output at the operational amplifier 58 are also fed back into the input of the operational amplifier 20. The effect of these imperfections when they reach the operational amplifier 20 and determine the current flowing in the RTD element 30 may be either beneficial or detractive from the desired linear response depending upon the manner in which the curve of RTD resistance 30 versus temperature and the imperfectly linear curve of current generated by the operational amplifier 20 fit together in performing the multiplication of current and resistance (current determined by operational amplifier 20 times the resistance of the RTD element 30). It is possible that these imperfections which are fed back by the resistor 84 add to the linearity of the overall circuit output over one portion of the temperature range to be measured and detract from the linearity over another portion. However, it has been found that these imperfections often improve the degree to which the output of the FIG. 2 circuitry approaches a linear response. Because the result of multiplying the curve representing current and the curve representing RTD resistance is complex and dependent on curve fitting deviation from linear, response will occur at the upper temperature to be measured or at the lower temperature. The maximum deviation from linearity will depend upon the selection of values of the resistor 84 and the output of the reference voltage source 80.

The term "best fit" or "best curve fit" is often used in the temperature measuring art as a term descriptive of the maximum deviation between a first curve and a second curve having finite end points and having separations which vary along the curves between these two end points. In this sense, the term "best fit" describes the point of maximum difference between the two curves.

Therefore, it may be understood that the differential voltage between the output of the amplifier 58 and the terminal 86 is divided by the resistor 84. The resulting voltage caused by current flowing through the resistor 84 is multiplied in the resistor 82 and appears as a voltage on the terminal 18 of the operational amplifier 20. Therefore, a small change in signal voltage at the terminal 18 causes the operational amplifier 20 to change the current flow through the RTD 30 which, in turn, is sensed by the operational amplifier 58. When the operational amplifier 58 senses this small change in current, it again produces a small change in voltage on terminal 72 and there is a resulting slight change in current flow through the resistor 84. This slight change in current through the resistor 84 closely follows a 2nd order equation. Resistor 84 is adjusted so that the current multiplied by the resistance of the RTD 30 is an approximate linear function with respect to temperature.

In the FIG. 2 circuitry, the voltage appearing at the output terminal 72 of the operational amplifier 58 represents voltage across RTD element 30 resulting from the temperature thereof. However, the voltage appearing between the terminal 72 and the common signal conductor 70 also contains a voltage component of the value of the voltage of the reference source 80 at the juncture 86. In order that the reading appearing on the voltage sensitive device 76 not be biased or offset by the undesired component of the voltage source, the voltage sensing device 76 is not joined to the common signal conductor 70 but is instead joined to juncture 86. Thus, the component is subtracted from the voltage appearing at the terminal 72 of the operational amplifier 58.

MODIFICATIONS TO THE SYSTEM

Several modifications can be made to the circuitry of this invention as it is shown in FIG. 2 of the drawings in order that the RTD element 30 may comprise a material other than platinum or so that the voltage sensing instrument 76 may comprise a device other than a digital voltmeter or so that different sensitivities to temperature may be embodied into the system without generating undue heat in the RTD element 30. Each of these and other modifications to the invention thus far described is considered to be within the scope of this invention.

FIG. 3

Figure 3:
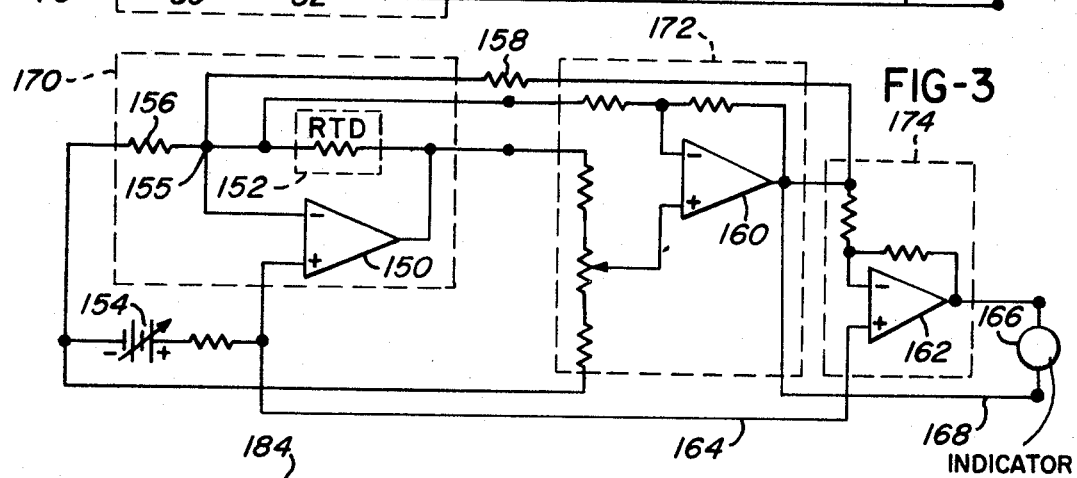
FIG. 3 is another electrical schematic diagram showing modifications of the FIG. 2 circuitry.

FIG. 3 of the drawings illustrates a modification of the FIG. 2 circuitry. In FIG. 3, there is shown an embodiment of the temperature measuring system of the present invention wherein an operational amplifier 150 corresponds to the operational amplifier 20 in FIG. 2 and an operational amplifier 160 corresponds to the operational amplifier 58 in FIG. 2 and wherein a resistance temperature detector element 152 is similar to the RTD element 30 in FIG. 2. The amplifier 150 has a summing node 155 which corresponds to the summing node 16 in FIG. 2. A reference source 154 of FIG. 3 corresponds to the reference source 80 of FIG. 2. A voltage sensing device 166 corresponds with the voltage sensing device 76 of FIG. 2. A conductor 168 connects the operational amplifier 160 to the voltage sensing device 166.

The circuit of FIG. 3 thus comprises a first operational amplifier network 170, which includes a surrounding resistance network and is connected to a second operational amplifier network 172 which includes the operational amplifier 160 and its surrounding resistance network and a third operational amplifier network 174 including its surrounding resistance network. The third operational amplifier network is connected to the output of the operational amplifier 160 and is also connected by a lead 164 to the reference source 154 at the positive input terminal of the operational amplifier 150. A resistor 158 provides a path for temperature dependent signals to enter the operational amplifier 150.

The circuit of FIG. 3 operates in a manner similar to the circuit shown in FIG. 2, with two notable exceptions. The first of these exceptions concerns the feeding of signal from the output of the operational amplifier 160 through resistance element 158 into the operational amplifier 150. In the FIG. 3 circuit this feed-back signal (which represents the temperature dependent correction signal) is connected to the summing node 155 of operational amplifier 150. Connecting the temperature dependent signal into the summing node of operational amplifier 150 has the effect of decreasing the current flowing in the RTD element 152 as the temperature of the RTD element 152 increases.

As noted in the curves of FIG. 1, described earlier in this specification, some metals which are usable in RTD elements, mainly the metals nickel, "Balco" and tungsten display an increasing resistance sensitivity with increasing temperature; that is, their resistance departs from a linear function of temperature by an increasing amount of resistance as the temperature of the metal increases. As described above, an RTD element of platinum has a decreasing sensitivity which may be compensated for by increasing the current flowing in the platinum element as the temperature of the RTD element is increased. In accordance with this principle, a compensating circuit which permits the use of RTD elements made of metals such as nickel, "Balco" and tungsten is required to decrease the current applied through the RTD element as the temperature of the RTD element increases. The circuit of FIG. 3 wherein the temperature dependent signal flowing through the resistance 158 is applied to the summing node input terminal of the operational amplifier 150 accomplishes this decrease in RTD element current with increasing temperature. The circuit of FIG. 3 therefore shows that it is possible by means of a simple modification of the circuitry shown in FIG. 2 to change the temperature compensation from that suitable for a concave downward RTD element to that suitable for a concave upward RTD element. Through the use of resistance versus temperature curves for other metals such as copper, iron and aluminum, it is possible to employ the compensation circuitry shown in FIGS. 2 and 3 for these and other materials over at least a limited range of temperature.

The circuitry of FIG. 3 also differs from that shown in FIG. 2 in another respect. In FIG. 3 the output of the operational amplifier 160 is connected to a third operational amplifier 162. Use of a third operational amplifier permits additional amplification of the signal obtained from the RTD element in order that greater sensitivities; that is, a larger number of millivolts output for every degree of temperature change is attained with the circuit. When a third operational amplifier is used, the voltage sensing device 166 does not need to be a high input impedance device because the voltage sensing device 166 is connected between the output of the operational amplifier 162, which is a low point of impedance and the common signal conductor 168. The positive input terminal of the operational amplifier 162 is joined to the reference source 154 by means of the lead, or conductor 164. When the circuitry of this invention is embodied substantially as shown in FIG. 3, it is possible that the voltage sensing device 166 may be a conventional D'Arsonval type of instrument having significant current input requirements.

FIG. 4

Figure 4:
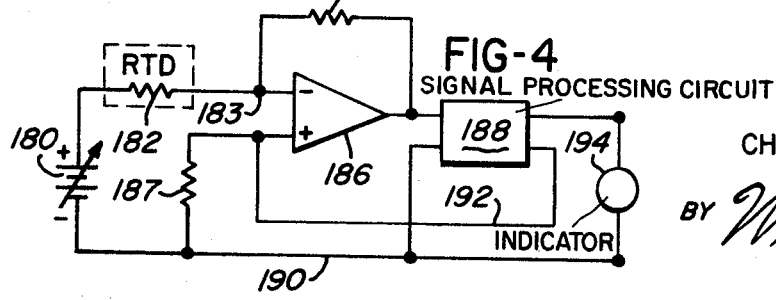
FIG. 4 is an electrical schematic diagram showing yet another modification of the circuitry of FIG. 2.

In FIG. 4 of the drawings, there is shown another modification of the FIG. 2 circuitry. In FIG. 4, there is shown an RTD element 182 connected to an operational amplifier 186, having a feed-back resistance element 184 connected between its output and summing node terminals and having a source of reference voltage 180 applied to the input summing node terminal via the RTD element 182. The output of the operational amplifier 186 is joined to a circuit 188 which provides amplification, processing and subsequent application of a temperature signal to a voltage sensing indicator instrument, such as an instrument 194. In the FIG. 4 circuitry, a signal proportional to the temperature of the RTD element is coupled via a conductor 192 from the circuitry 188 into the operational amplifier 186. In FIG. 4, a signal sensed by the voltage indicator instrument 194 is measured between the output of circuitry 188 and a common signal conductor 190.

The major difference between the circuitry of FIG. 4 and that of FIG. 2 relates to the position of the RTD element 182 between the summing node of an operational amplifier and a source of zero signal; in this case, between the summing node 183 and the source of reference voltage 180. Connecting the RTD element into the position shown in FIG. 4, provides an output signal from the operational amplifier 186 which is responsive to the temperature of the RTD element 182. However, the effect produced on the output of operational amplifier 186 by a change in RTD resistance is somewhat different in the FIG. 4 circuit from that of the circuit of FIG. 2.

In the FIG. 4 circuit, the RTD element 182 has impressed across its terminals a constant voltage rather than having passed through it a constant current, as was the case in FIG. 2. That is, the voltage appearing across the RTD element 182 in the position shown in FIG. 4 is constant and independent of the resistance of the RTD element by virtue of the operational characteristics of the operational amplifier 186. When the RTD element is operated in a constant voltage position, as shown in FIG. 4, the influence of the RTD element 182 upon operational amplifier 186 relates to that of changing of the gain of the amplifier. Thus, the output signal from the operational amplifier 186 is dependent upon the resistance of RTD element 182, because the output signal from the operational amplifier 186 is directly proportional to the value of the resistance element 184 with respect to the value of the resistance element 182. The signal applied through the conductor 192 enters the positive terminal of the operational amplifier 186. Depending upon the nature of the circuitry 188, the feed-back signal within the conductor 192 may be properly applicable to either the positive or the negative input terminal of the operational amplifier 186. The resistance element 187 provides a return for the positive input of the operational amplifier 186 to the common signal conductor 190. Depending uopn the circuitry 188, the resistance element 187 may or may not be required.

It is possible to make other alterations to the circuitry which has been described in this specification without altering the spirit of the invention which is disclosed herein. For example, differing forms of the signal adding resistor networks including resistance members 182 and 184 in FIG. 4 may easily be provided by a person skilled in the electronics arts. In a similar manner, other resistance network configurations associated with the operational amplifier 58 in FIG. 2 are possible while yet retaining the needed differential response to the signal developed across the RTD element 30. It is also possible within the spirit of the invention to select a ratio other than 1 to 1, as previously described, for the ratio between RTD element 30 and the resistance element 14.

In this application, each instrument which has been designated by the numeral 76, 166 or 194 may be any suitable voltage sensing instrument such as a voltmeter which reads digitally, or otherwise, in degrees of temperature or any other suitable instrument.

In a similar manner, each of the elements 30, 152 or 182 may be referred to as a resistance temperature detector element, a RTD element, a temperature-sensing electrical resistance element, a temperature detector means, a metallic resistance element, a temperature sensor, a sensing resistance and the like. It is intended that the scope of the present invention not be limited by the names applied to the sensing element of the system.

A system made in accordance with the present invention and essentially in accordance with circuitry of this invention has been found to compensate for non-linear resistance temperature detector element response at temperatures which are both above the 32 degrees Fahrenheit point, at which the resistance characteristics of platinum are described by the Callendar equation, and also to compensate for non-linearities existing at temperatures below 32° F. at which the non-linearities are describable by the Callendar-Van Dusen form of the equation for platinum.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth as disclosed and defined in the appended claims.

The invention having thus been described the following is claimed:

1. Temperature measuring apparatus comprising:
    a resistance temperature detector element having an electrical resistance versus temperature characteristic which differs in a slight and systematic manner from a linear first order mathematical expression relating resistance and temperature,
    means for sensing the voltage generated across said resistance temperature detector element as current flows therein and for providing an electrical output voltage signal indicative thereof,
    means for inducing only in said resistance temperature detector element a constant and temperature invariant first electrical current having an amplitude that generates across said resistance temperature detector element a convenient and predetermined increment of voltage for each degree of temperature change incurred by said resistance temperature detector element,
    means responsive to said electrical output voltage signal for inducing only in said resistance temperature detector element in summation with said first electrical current a second electrical current which is smaller than said first electrical current and which is proportional to said electrical output voltage signal, whereby said second electrical current has an amplitude of zero when the temperature of the resistance temperature detector element is a given reference temperature, the electrical output voltage signal being zero when the temperature of the resistance temperature detector element is equal to said given reference temperature, at any other temperature of the resistance temperature detector element the second electrical current having an amplitude which is proportional to the difference between said given reference temperature and said other temperature,
    said means including means for creating across only the resistance temperature detector element a voltage resulting from both induced currents, which voltage has a substantially constant change with respect to temperature change,
    whereby the resultant current flowing in said resistance temperature detector element is not a current of constant amplitude which generates a voltage reproductive of the resistance char-acteristic of the resistance temperature detector element which differs in a slight and systematic manner from a linear first order mathematical expression, the resultant current, instead, being a varying temperature related current which generates only across said resistance temperature detector element a voltage which is more nearly a straight line function of the temperature thereof and in which the voltage has values greater than and less than the straight line function of temperature values.

2. The apparatus of claim 1 in which the means for inducing only in said resistance temperature detector element a constant and invariant first electrical current includes a relatively small voltage source having internal resistance, capable of exciting said resistance temperature detector element, and in which the means responsive to said electrical output signal includes a signal path to said relatively small voltage source having an internal resistance, and in which the apparatus includes a temperature indicator instrument, and means connecting the temperature indicating instrument to the small voltage source having an internal resistance, whereby the voltage of the small voltage source having an internal resistance is subtracted from the voltage applied to the temperature indicating instrument and said apparatus provides an output signal free of offset voltages without the use of bridge circuitry.

3. An electrical circuit for exciting a temperature sensing electrical resistance element having an electrical resistance characteristic differing from a straight line condition of resistance versus temperature by successively larger increments of resistance at successive temperatures which are increasingly removed from a reference temperature at which the electrical output of the current is zero to produce an electrical voltage across said temperature sensing electrical resistance element which has a substantially linear relationship with the temperature thereof, said electrical circuit comprising:
    an operational amplifier connected for the linear mode of operation and having input means including a summing node input terminal, the operational amplifier having an output signal responsive current path, means for connecting the temperature sensing electrical resistance element to the summing node terminal and within the output signal responsive feedback current path associated with said operational amplifier,
    a source of constant and temperature invariant electrical signal,
    means joining the input means of the operational amplifier to the source of constant and temperature invariant electrical signal for inducing a constant and temperature invariant current of predetermined magnitude only in said temperature sensing electrical resistance element,
    a source of temperature dependent electrical voltage signal having a magnitude which changes in proportion to the temperature difference between the temperature of the temperature sensing resistance element and said reference temperature,
    means for connecting the source of temperature dependent electrical voltage signal to said input means of the operational amplifier and to the temperature sensing resistance element.

4. The electrical circuit of claim 3 in which the operational amplifier has a second input terminal and which includes means connecting the second input terminal to the source of constant and temperature invariant electrical signal.

5. The electrical circuit of claim 3 in which the operational amplifier has a second input terminal and which includes means connecting the second input terminal to the source of temperature dependent electrical signal.

6. The electrical circuit of claim 3 which includes means connecting the summing node terminal of the operational amplifier to the source of constant and temperature invariant electrical signal.

7. The electrical circuit of claim 3 which includes means connecting the summing node terminal of the operational amplifier to the source of temperature dependent electrical signal.

8. The electrical circuit of claim 3 in which the operational amplifier has an output terminal and in which the output signal responsive current path associated with said operational amplifier includes circuit means located between the output terminal and the summing node input terminal.

9. An electrical circuit for exciting a temperature sensing electrical resistance element having an electrical resistance characteristic differing from a straight line curve of resistance versus temperature by successively larger increments of resistance at successive temperatures which are increasingly removed from a reference temperature at which the electrical output of the current is zero, to produce an electrical voltage across said temperature sensing electrical resistance element which has a substantially linear relationship with the temperature thereof, said electrical circuit comprising:
  an operational amplifier connected for the linear mode of operation and having input means including a summing node input terminal,
  means for connecting the temperature sensing electrical resistance element to the summing node terminal and within the output signal responsive feedback current path associated with said operational amplifier,
  a source of constant and temperature invariant electrical signal,
  means joining the input means of the operational amplifier to the source of constant and temperature invariant electrical signal for inducing a constant and temperature invariant current of predetermined magnitude in said temperature sensing electrical resistance element,
  a source of temperature dependent electrical voltage signal having a magnitude which changes in proportion to the temperature difference between the temperature of the temperature sensing resistance element and said reference temperature,
  means for connecting the source of temperature dependent electrical voltage signal to said input means of the operational amplifier,
  a differential amplifier circuit, including an operational amplifier device, resistive network means connected to the operational amplifier device and including input terminal means,
  means for connecting said input terminal means to the temperature sensing electrical resistance element,
  the differential amplifier circuit responding to a differential signal received from the temperature sensing electrical resistance element and rejecting common mode signals received from the temperature sensing electrical resistance element.

10. The electrical circuit of claim 9 which includes means joining the source of temperature dependent electrical signal to the output of said operational amplifier device.

11. Temperature responsive apparatus comprising in combination:
  a thermally responsive resistor element detecting the temperature of a given environment, the thermally responsive resistor element having a resistance characteristic which is non-linear with respect to temperature,
  means inducing directly into the thermally responsive resistor element a current of constant magnitude,
  means inducing directly into the thermally responsive resistor element a current which is responsive to the temperature of the environment detected by the thermally responsive resistor element and proportional to the instantaneous resistance of the thermally responsive resistor element,
  the current induced in the thermally responsive resistor element which is a function of temperature of the environment thus compensating for the deviation from a first order mathematical equation relating resistance and temperature which exists in the thermally responsive resistor element,
  the resultant current in the thermally responsive resistor element thus producing a voltage across the thermally responsive resistor element which varies substantially linearly with the temperature thereof,
  and means sensing the voltage across the thermally responsive resistor element.

12. Temperature responsive apparatus of claim 11 in which the thermally responsive resistor element is characterized substantially by the equation:

$$T = (R_T - R_O)/(R_{100} - R_O)\ 100 + k\ (\ T\ )/(100 - 1)\ 100 + B\ [(\ T\ )/(100 - 1)\ (\ T\ )^3/(100),]$$

wherein:
  $T$ = T in degrees C.
  $R_T$ = resistance of thermometer at temperature T.
  $R_O$ = resistance of thermometer at zero° C.
  $R_{100}$ = resistance of thermometer at 100° C.
  $k$ = a constant of thermometer at the boiling point of sulphur (444.6° C).
  $B$ = a constant based upon the boiling point of oxygen (−182.97° C) and the ice point of water (0° C).

13. The temperature responsive apparatus of claim 11 in which the thermally responsive resistor element is a resistance element provided with two current terminals and two voltage terminals, each current terminal being connected to a voltage terminal and each voltage terminal being connected to a current terminal.

14. The temperature responsive apparatus of claim 11 in which the means inducing in the thermally responsive resistance element a current which is a function of temperature of the environment includes an operational amplifier.

15. The temperature responsive apparatus of claim 11 which includes a first operational amplifier which generates the resultant current in the temperature detector means and a second operational amplifier which senses voltage across the temperature detector means, voltage sensing instrument means,
  means connecting the voltage sensing instrument means to the second operational amplifier and to the input of the first operational amplifier.

16. The temperature responsive apparatus of claim 11 in which both of said means inducing current in the temperature detector means include the same operational amplifier, a source of reference voltage of constant magnitude, voltage sensing instrument means, means connecting the voltage sensing instrument means to the operational amplifier and to the source of reference voltage.

17. The temperature responsive apparatus of claim 11 in which the means inducing in the thermally responsive resistance element a current which is a function of the temperature of the environment detected by the thermally responsive resistance element includes two operational amplifiers, one of the operational amplifiers being connected to provide current to the thermally responsive resistance element and the other operational amplifier being connected to sense the voltage across the thermally responsive resistance element.

18. The temperature responsive apparatus of claim 11 in which the means inducing in the thermally responsive resistance element a current of constant magnitude includes an operational amplifier having input terminal means and in which a source of constant signal is applied to the input terminal means.

19. The temperature responsive apparatus of claim 18 in which the operational amplifier has output terminal means and in which the thermally responsive resistance element is connected between the output terminal means and the input terminal means of the operational amplifier.

20. The temperature responsive apparatus of claim 19 in which the input terminal means includes a summing node and in which the thermally responsive resistance element is connected between the summing node and the output terminal means.

21. The temperature responsive apparatus of claim 18 which includes a point of zero signal and in which the thermally responsive resistance element is connected between the point of zero signal and the input terminal means of the operational amplifier.

22. A method for obtaining over a limited temperature range an electrical output signal which is approximately linear with respect to temperature and which is substantially describable by a first order mathematical equation relating output signal and temperature obtained from an electrical resistance sensor device which has a characteristic of resistance versus temperature which departs from a straight line first order mathematical curve of resistance versus temperature by monotonically increasing amounts of resistance for temperatures which are increasingly removed from a temperature of absolute zero degrees, said method comprising the steps of:

exciting only the electrical resistance sensor device with an electrical current having two components, the components being a first component which is constant and temperature independent in magnitude and a second component which is temperature dependent and of zero magnitude at some reference temperature located within the range of temperatures to be measured and of approximately linearly increasing magnitude with temperature at temperatures removed from the reference temperature, deriving the second component of current linearly from said electrical output signal which is approximately linear with respect to temperature, adjusting the amount of said second component to a value producing the minimum amount of difference over said limited temperature range between said electrical output signal and a signal which is ideally linear with respect to temperature.

23. Thermally responsive apparatus, comprising: a first operational amplifier device having a positive input terminal and a negative input terminal and an output terminal, a thermally responsive resistor device having a pair of current terminals at opposed ends thereof, and a pair of voltage terminals at opposed ends thereof, one of the current terminals being joined to the negative input terminal of the first operational amplifier and the other current terminal being joined to the output terminal of the operational amplifier, a common signal conductor, a temperature stable resistance member having an end joined to the negative input terminal of the first opera-tional amplifier, an opposite end of the temperature stable resistance member being joined to the common signal conductor, a source of temperature stable voltage having a given internal resistance and connected between the common signal conductor and the positive input terminal of the first operational amplifier, a second operational amplifier having a positive input terminal and a negative input terminal and an output terminal, a resistor having an end connected to the output terminal and an opposite end connected to the negative input terminal of the second operational amplifier, a resistance device having an adjustable tap between the ends thereof joined to the positive input terminal of the second operational amplifier, one end of the resistance device being connected to the common signal conductor and the other end of the resistance device being connected to one of the voltage terminals of the thermally responsive resistor, a resistor member having an end joined to the negative input terminal of the second operational amplifier and an end thereof connected to the other voltage terminal of the thermally responsive resistor device, a feedback resistance element having an end connected to the positive input terminal of the first operational am-plifier and an end connected to the output terminal of the second operational amplifier, a voltage sensing temperature indicator instrument connected to the output terminal of the second operational amplifier and to the positive input terminal of the first operational amplifier.

24. The thermally responsive apparatus of claim 23 in which the resistance value of the temperature stable resistance member and the resistance value of the thermally responsive resistor device are substantially equal at a given reference temperature.

25. The thermally responsive apparatus of claim 23 in which the resistance value of the feedback resistance element is substantially 250 times the resistance value of the internal resistance of the source of temperature stable voltage.

26. Temperature responsive apparatus comprising in combination:

temperature detector means detecting the temperature of a given environment, the temperature detector means having a resistance characteristic which is non-linear with respect to temperature, means inducing in the temperature detector means a current of constant magnitude, means inducing in the temperature detector means a current which is responsive to the temperature of the environment detected by the temperature detector means and proportional to the instantaneous resistance of the temperature detector means, the current induced in the temperature detector means which is a function of the temperature of the environment thus compensating for the deviation from a first order mathematical equation relating resistance and temperature which exists in the resistance detector means, the resultant current in the temperature detector means thus producing a voltage across the temperature detector means which varies substantially linearly with the temperature thereof, means sensing the voltage across the temperature detector means, the means sensing the voltage across the temperature detector means including an operational amplifier.

27. The temperature responsive apparatus of claim 26 which includes a voltage sensing instrument joined to the operational amplifier.

28. The temperature responsive apparatus of claim 26 which includes a second operational amplifier and a digital voltmeter, the second operational amplifier joining the digital voltmeter to the first said operational amplifier.

* * * * *